March 28, 1950     H. C. HAGENAH     2,501,721
TRAILER HITCH
Filed Oct. 22, 1947     2 Sheets-Sheet 1
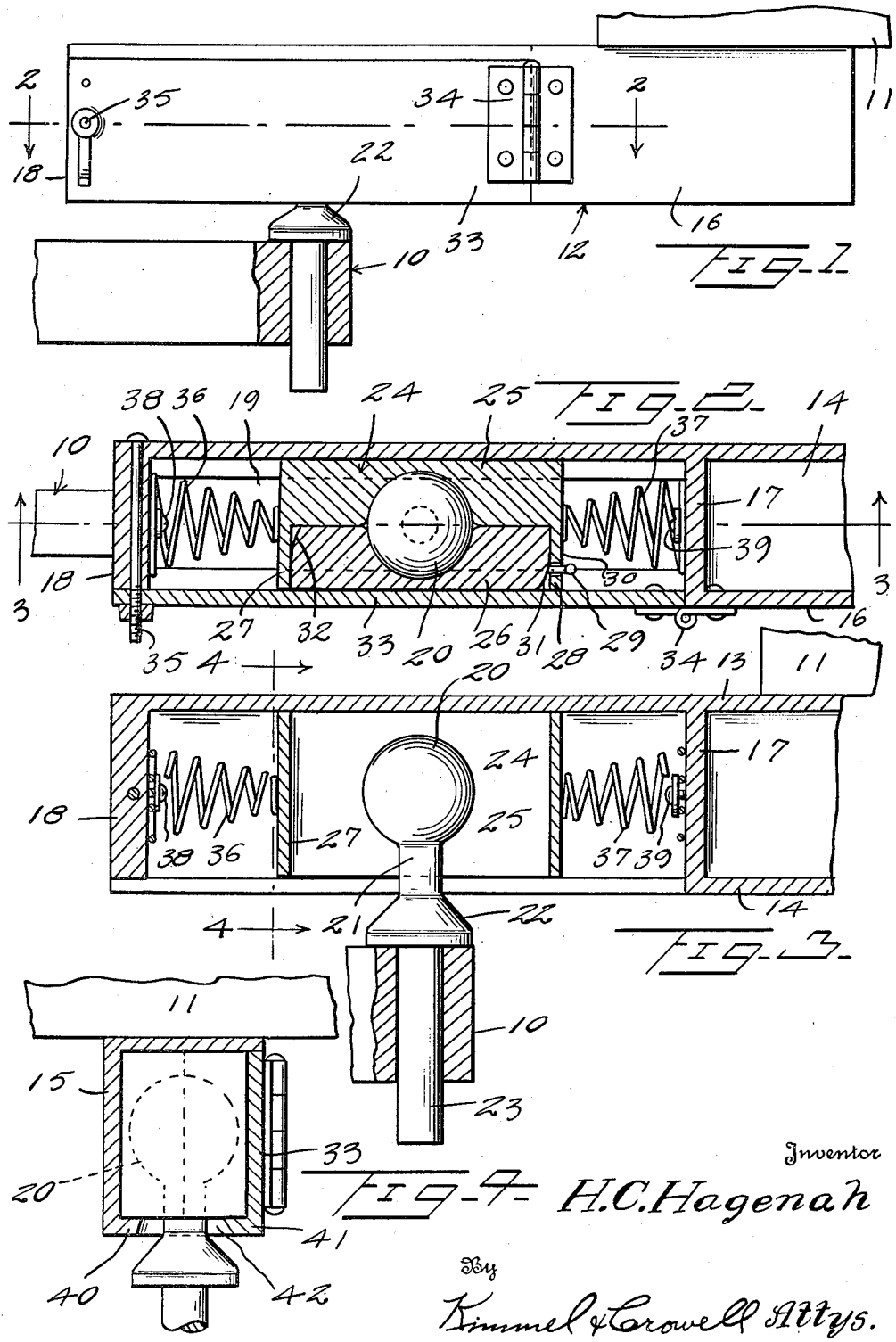
Inventor
H. C. Hagenah
By Kimmel & Crowell Attys.

March 28, 1950     H. C. HAGENAH     2,501,721
TRAILER HITCH
Filed Oct. 22, 1947     2 Sheets-Sheet 2
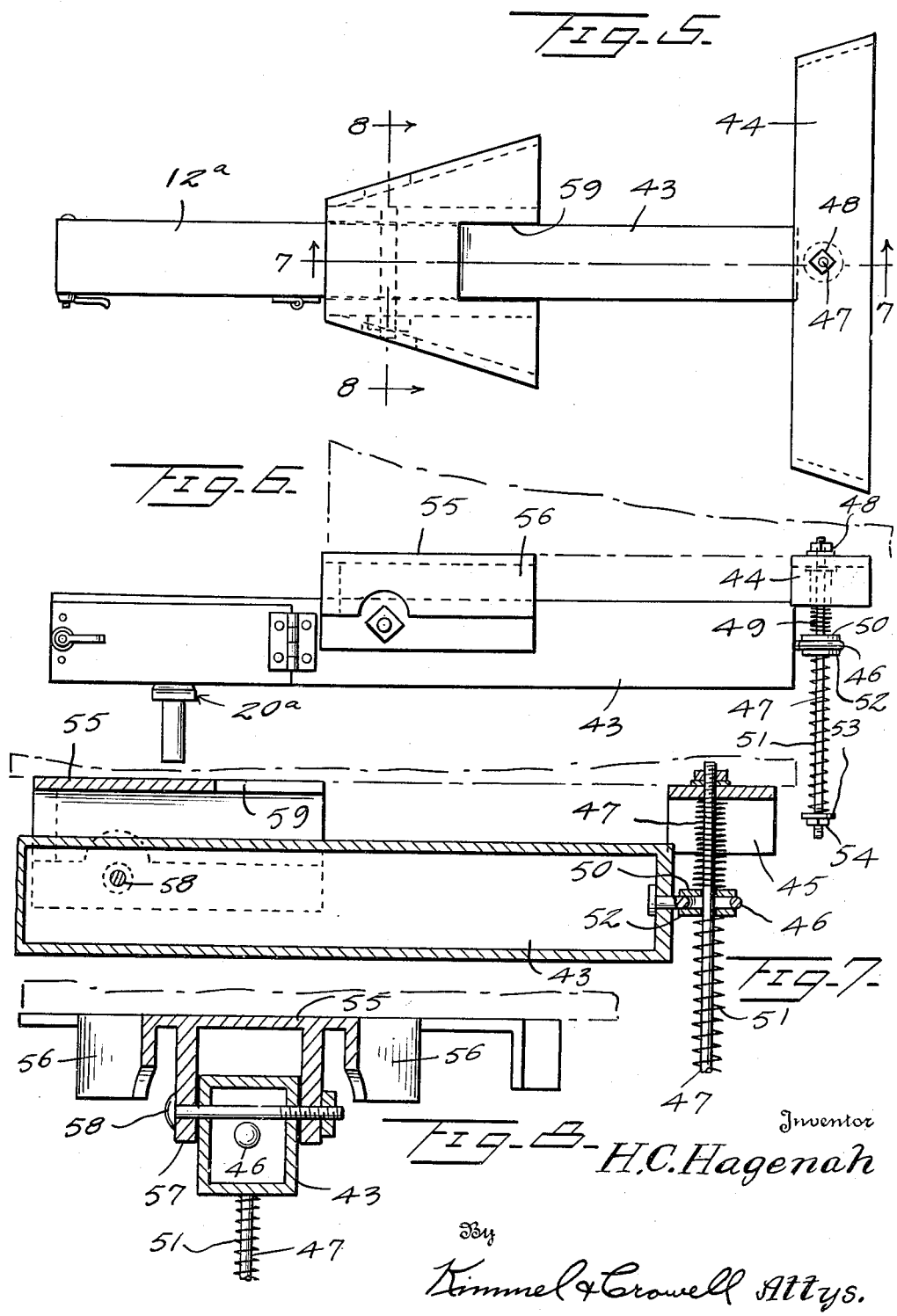

Patented Mar. 28, 1950

2,501,721

UNITED STATES PATENT OFFICE 2,501,721

TRAILER HITCH

Harry C. Hagenah, Conrad, Mont.

Application October 22, 1947, Serial No. 781,269

2 Claims. (Cl. 280—33.9)

This invention relates to trailer hitches.

An object of this invention is to provide a hitch for coupling a trailer vehicle to a tractor vehicle which is so constructed and arranged that horizontal movement between the two vehicles is cushioned so as to relieve the coupling between the vehicles of shocks incident to such movement.

Another object of this invention is to provide a hitch of this kind wherein vertical movement between the two vehicles is also cushioned so that vertical shocks will be smoothed out and the vertical rocking of one vehicle will not be communicated to the other vehicle.

A further object of this invention is to provide a cushioned hitch embodying a sliding two-part ball socket within which the ball coupling member of the tractor vehicle is adapted to removably engage so that the two vehicles may be easily and quickly coupled together or separated without the use of tools.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detailed side elevation, partly broken away and in section, of a trailer hitch constructed according to an embodiment of this invention.

Figure 2 is a sectional view taken on the line 2—2 of Figure 1.

Figure 3 is a fragmentary sectional view taken on the line 3—3 of Figure 2.

Figure 4 is a sectional view taken on the line 4—4 of Figure 3.

Figure 5 is a plan view of a modified form of this invention.

Figure 6 is a detailed side elevation of the device shown in Figure 5.

Figure 7 is a fragmentary sectional view taken substantially on the line 7—7 of Figure 5.

Figure 8 is a sectional view taken on the line 8—8 of Figure 5.

Referring to the drawings, and first to Figures 1 to 4, inclusive, the numeral 10 designates generally a draw bar which is connected to a tractor vehicle. A trailer draw bar 11 shown fragmentarily in Figure 1 is adapted to be detachably coupled to the draw bar 10 by a cushioned coupling as will be hereinafter described. The coupling for connecting the trailer draw bar 11 to the tractor draw bar 10 includes an elongated housing, generally designated as 12, which is adapted to be fixedly secured by suitable fastening means (not shown) to the trailer draw bar 11. The housing 12 includes top and bottom walls 13 and 14, respectively, and opposite side walls 15 and 16, respectively. An intermediate partition 17 is disposed within the housing 12 being positioned between the opposite ends of the housing and forming with the front wall 18 a coupling chamber 19. The tractor draw bar 10 has fixed thereto a ball member 20 which includes a stem 21 extending downwardly from the ball 20 and also includes a flange 22 engaging on the upper side of the draw bar 10. A shank 23 extends downwardly from the flange 22 and is adapted to be fixedly secured by suitable fastening means in the draw bar 10. The ball 20 is adapted to engage in a ball socket, generally designated as 24, which is slidable within the chamber 19.

The socket 24 includes complementary members 25 and 26 and preferably the socket member 25 is formed with a pair of end flanges 27 and 28 within which the socket member 26 loosely engages. The socket member 26 is loosely held with respect to the socket member 25, by means of one or more fastening members 29 engaging through an opening 30 formed in the flange 28. The socket member 26 is formed at the opposite end thereof with rounded end portions 31 and 32 so that when the socket member 26 is moved outwardly to ball releasing position, this socket member may readily swing outwardly between the end flanges 27 and 28. The socket member 24 is held against lateral movement in the compartment 19 by means of a hinged closure 33 which is hinged as at 34 and secured in closed position by means of a bolt 35. The socket member 24 is yieldably held against endwise movement in the chamber 19 by means of a pair of springs 36 and 37 which engage the opposite ends of the socket member 24 and are secured as at 38 and 39 to the walls 18 and 17, respectively.

The side wall 15 has projecting inwardly from the lower edge thereof a flange 40 and a closure 33 has projecting inwardly from the lower edge thereof a flange 41. The two confronting flanges 40 and 41 form a space 42 within which the shank 21 is adapted to loosely engage so that ball 20 can freely move endwise within the chamber 19. The flanges 40 and 41 also form guides for the socket member 24.

Referring now to Figures 5 to 8, inclusive, there is disclosed a slightly modified form of this invention. A housing 12a is provided which is identical with the housing 12 with the exception that the rear portion of the housing is slightly longer than the rear portion of the housing 12. The housing 12a has associated therewith a ball socket similar to the socket 24 for slidably coupling a ball member 20a within the chamber similar to chamber 19. The rear portion 43 of the housing 12a has secured thereto a transversely extending bar 44 formed with downwardly extending flanges 45 at the opposite ends thereof.

The flanges 45 diverge rearwardly and are adapted to engage on the outer side of a forwardly convergent trailer draw bar assembly. The transverse bar 44 is yieldably mounted on the rear portion 43, the rear portion 43 having an eye 46 secured thereto through which an elongated bolt 47 loosely engages. The bolt 47 is secured as at 48 to the central portion of the bar 44 and an upper spring 49 constantly urges the bar 44 upwardly. The spring 44 at its lower end bears against a washer 50 disposed on the upper side of the eye 46. A lower equalizing spring 51 engages about the bolt 47 and bears at its upper end against a washer 52 which engages against the lower side of the ring 46.

The lower end of the spring 51 bears against a lower washer 53 which is held against downward movement by means of a spring tensioning nut 54 threaded on the bolt 47. The draw bar of the trailer vehicle is adapted to be pivotally secured to the housing 12a by means of a substantially V-shaped plate 55 which has extending from the opposite forwardly divergent edges thereof depending flanges 56. The plate 55 also has extending downwardly from the lower side thereof a pair of inner parallel flanges 57 which are pivotally mounted on a bolt 5 extending through the rear housing portion 43. The plate 55 as shown in Figures 5 and 7 is cut out as indicated at 59 so that this plate may have constant rocking movement on the pivot 48 and with respect to the housing 12a.

With a trailer hitch or coupling as shown in Figures 5 to 8, inclusive, the trailer and tractor vehicles may have vertical movement one relative to the other without transmitting shocks incident to such vertical movement from one vehicle to the other. In other words, the trailer hitch shown in Figures 5 to 8, inclusive, will not only provide a cushioned horizontal movement between the tractor and trailer vehicles but will also provide cushioned vertical movement between the two vehicles.

In the use and operation of this hitch the ball 20 is adapted to be fixedly secured to the tractor draw bar 10 and the housing 12 is fixedly secured to the trailer draw bar 11. During the horizontal movement of the two vehicles the strain between the two vehicles is cushioned by means of the oppositely disposed cushion springs 36 and 37. When it is desired to uncouple the tractor and trailer vehicles, the closure 33 is swung outwardly to open position and the outer socket member 26 may then be swung outwardly to released position permitting the ball 20 to be disengaged from the socket member 24.

The trailer hitch shown in Figures 5 to 8, inclusive, will operate in the same manner as the hitch shown in Figures 1 to 4, with the exception that the hitch shown in Figures 5 to 8 will provide cushioning means for the vertical movement between the two vehicles.

I claim:

1. A trailer hitch for connecting the draw bar of a tractor vehicle with the draw bar of a trailer vehicle, comprising an elongated member formed with an elongated socket chamber, a ball socket slidable in said chamber, a coupling plate rockably carried by said member between the ends thereof and adapted to be fixed to the forward end of the trailer draw bar, a transversely disposed bar at the rear end of said member and adapted to be fixed to the trailer draw bar, a guide eye fixed to the rear end of said member, a bolt having one end fixed to said transverse bar and loosely extending through said eye, a pair of springs about said bolt, one of said springs being interposed between said guide eye and said transverse bar and the other of said springs having one end abutting said eye and the other end thereof fixed relative to the other end of said bolt for resiliently resisting vertical movement of said bolt and said transverse bar relative to said member, springs in said chamber resisting movement of said socket in opposite directions, and a ball engaging in said socket and adapted to be fixed to the tractor draw bar.

2. A trailer hitch for connecting the draw bar of a tractor vehicle with the draw bar of a trailer vehicle comprising an elongated member having a socket chamber formed therein, a ball socket horizontally slidable in said chamber, springs in said chamber resisting movement of said socket in opposite directions, a ball engageable in said socket and adapted to be fixed to the tractor draw bar, a coupling plate rockably mounted on said member intermediate the ends of the latter and adapted to be fixed to the forward end of the trailer draw bar, a transversely disposed bar at the rear end of said member and adapted to be fixed to the trailer draw bar, vertically slidable connecting means securing said transverse bar to said rear end of said member, and spring means interposed between said transverse bar and said rear end of said member and adapted to resiliently resist vertical movement of said transverse bar relative to said member whereby vertically and horizontally directed shocks are absorbed by said latter spring means and said first mentioned springs respectively.

HARRY C. HAGENAH.

REFERENCES CITED

The following references are of record in the file of this patent:

UNITED STATES PATENTS

| Number | Name | Date |
|---|---|---|
| 1,159,473 | Church | Nov. 9, 1915 |
| 1,186,182 | Garman | June 6, 1916 |
| 1,450,665 | Crozier | Apr. 3, 1923 |
| 2,121,416 | White | June 21, 1938 |
| 2,238,095 | Almcrantz | Apr. 15, 1941 |